United States Patent [19]

Washburn

[11] Patent Number: 5,010,996
[45] Date of Patent: Apr. 30, 1991

[54] WINDOW SILL ARMREST FOR MOTOR VEHICLES

[76] Inventor: Billy D. Washburn, 04 Peach Blossom, Los Lunas, N. Mex. 87031

[21] Appl. No.: 445,182

[22] Filed: Dec. 4, 1989

[51] Int. Cl.⁵ .............................................. B60J 9/00
[52] U.S. Cl. .................................................. 296/153
[58] Field of Search ........................................ 296/153

[56] References Cited

U.S. PATENT DOCUMENTS

| | | | |
|---|---|---|---|
| 1,962,508 | 6/1934 | Josselyn | 155/196 |
| 2,601,052 | 6/1952 | Ortleb | 296/49.2 |
| 2,715,544 | 8/1955 | Jones | 296/49.2 |
| 2,738,220 | 3/1956 | Simmons | 296/49.2 |
| 2,789,862 | 4/1957 | Boyer | 296/153 |
| 3,129,974 | 4/1964 | Carter | 296/49.2 |
| 3,326,600 | 6/1967 | Mathews | 296/153 |
| 3,451,717 | 6/1969 | Carter | 296/153 |
| 4,758,043 | 7/1988 | Reynoldos | 296/153 |

Primary Examiner—Robert R. Song
Attorney, Agent, or Firm—Deborah A. Peacock; Donovan F. Duggan

[57] ABSTRACT

A window sill armrest for motor vehicles. The armrest is hinged to freely accommodate vehicle window extension and retraction. Weighting means of sufficient mass is provided to ensure that the outer movable segment of the armrest is returned to a position flush with the vehicle window sill when the window is retracted.

48 Claims, 2 Drawing Sheets

WINDOW SILL ARMREST FOR MOTOR VEHICLES

BACKGROUND OF THE INVENTION

1. Field of the Invention

The present invention provides an attractive and functional armrest for attachment to the window sill of motor vehicles and a method of making such armrest.

2. Description of Related Art Including Information Disclosed Under 37 C.F.R. §§1.97- 1.99

Window sill armrests for motor vehicles are generally known in the prior art. Such armrests provide protection for the vehicle window and finish, as well as providing driver comfort. Many of such prior art armrests also have bending or pivoting elements to accommodate extension or retraction of the vehicle window. Representative of such armrests are disclosed in U.S. Pat. No. 3,129,974, entitled *Car Window Cushion* to Carter; U.S. Pat. No. 3,451,717, entitled *Car Window Arm Rest* to Carter; U.S. Pat. No. 1,962,506, entitled *Armrest* to Josselyn, U.S. Pat. No. 2,601,052, entitled *Protector Pad and Armrest for Automobile Windows* to Ortlieb., U.S. Pat. No. 2,738,220, entitled *Armrest for Attachment to Automobile Window Sills* to Simmons; U.S. Pat. No. 2,715,544, entitled *Armrest for Vehicle Door* to Jones; U.S. Pat. No. 4,758,043, entitled *Flap for Vehicle Windows* to Reynolds; and U.S. Pat. No. 3,326,600, entitled *Automobile Window Arm Rest* to Mathews.

Nevertheless, the need still exists for a functional, effective, and attractive hinged vehicle armrest which will return to a fully flush position with the window sill upon full retraction of the vehicle window. As noted above, while many of the prior art vehicle armrests provide hinged or pivotal action to accommodate window passage none remotely suggest or teach simple and effective means for ensuring the return of a hinged armrest to a fully flush position with the window sill.

SUMMARY OF THE INVENTION

The present invention relates to an armrest adapted to be attached to the window sill of a motor vehicle. This armrest comprises a longitudinal inner support segment affixable to the window sill by adhering means disposed on an underside thereof; a longitudinal outer resilient support segment proximate and outboard of the inner support segment, the outer support segment comprising weighting means; means for longitudinally hinging the outer segment to the inner affixable segment; and cover means for at least partially enclosing the segments.

At least one of the support segments may be curved to conform approximately to the curvature of the window sill.

The hinging means is preferably integral with the cover means and thinner in cross section than the support segments, thereby forming a slot. The slot may be sufficiently deep, such as by utilizing excess cover material, to accommodate vehicle windows which only partially retract. The cover means may be made of pile, mouton, leather, canvas, fabrics, and combinations thereof. In an alternative embodiment, the hinging means comprises elastic folding means, such as elastic strips, secured to the inner and outer resilient segments.

The weighting means comprise an elongate member, such as a rod, bar, tube, or magnet, made from a material such as metal, ceramic, wood or plastic. The weighting means is disposed on the outer edge of the outer longitudinal support segment.

The adhering means on the inner segment may be "peel off" adhesive strips. hook and pile fasteners, adhesive cement, or the like.

In the preferred embodiment, the cover means completely encloses the outer support segment and only partially encloses the inner support segment, such that the adhering means is directly in contact with the inner flexible material disposed within the inner support segment.

The invention further provides a method of making a window sill armrest for motor vehicles comprising the steps of:

(a) providing a longitudinal inner affixable resilient segment having an inner flexible support material and an adhering material disposed on one side thereof;

(b) providing a longitudinal outer resilient segment having an inner flexible support material and a weight member;

(c) positioning the longitudinal outer resilient segment proximate and outboard to the longitudinal inner resilient segment and forming a hinge between the outer segment and the inner segment; and (d) at least partially enclosing the weight member and the resilient segments, except for the adhering material, within a cover.

A primary object of the present invention is to provide a window armrest for a motor vehicle that is attractive in appearance yet functionally protective of the window and window sill of such vehicle.

Another object of the invention is to provide a motor vehicle window armrest which allows unobstructed passage of the window thereby.

Yet another object of the invention is to provide a window armrest for a motor vehicle that consistently returns to a flat position when the window is down, despite the presence of window molding.

Still another object of the invention is to provide a window armrest for a motor vehicle which is aesthetically compatible in texture and color with the motor vehicle interior decor and exterior finish.

Yet another object of the invention is the provision of a simplified method of making such armrest from easily obtainable components.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention.

DETAILED DESCRIPTION OF THE PREFERRED EMBODIMENTS OF THE INVENTION (BEST MODES FOR CARRYING OUT THE INVENTION)

This invention relates to an armrest adapted to be attached to the window sill of a motor vehicle. The armrest of the invention comprises a longitudinal inner resilient support segment which may be affixed to the vehicle window sill by adhering means disposed on the underside of such segment. Proximate and outboard of such inner segment is an outer movable resilient support segment, the outer support segment comprising weighting means. Longitudinal hinging means are provided for hinging the outer segment to the inner longitudinal segment. Cover means are provided for at least partially enclosing the segments and the weighting means.

Figure 1:
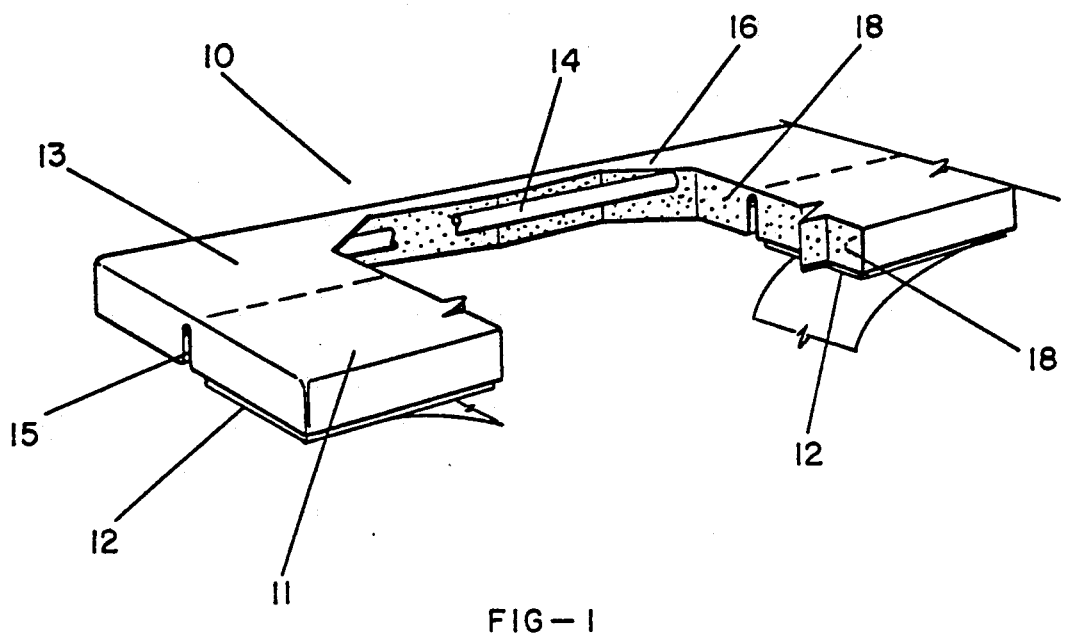
FIG. 1 is a cutaway view of the preferred embodiment of the invention.
Figure 3:
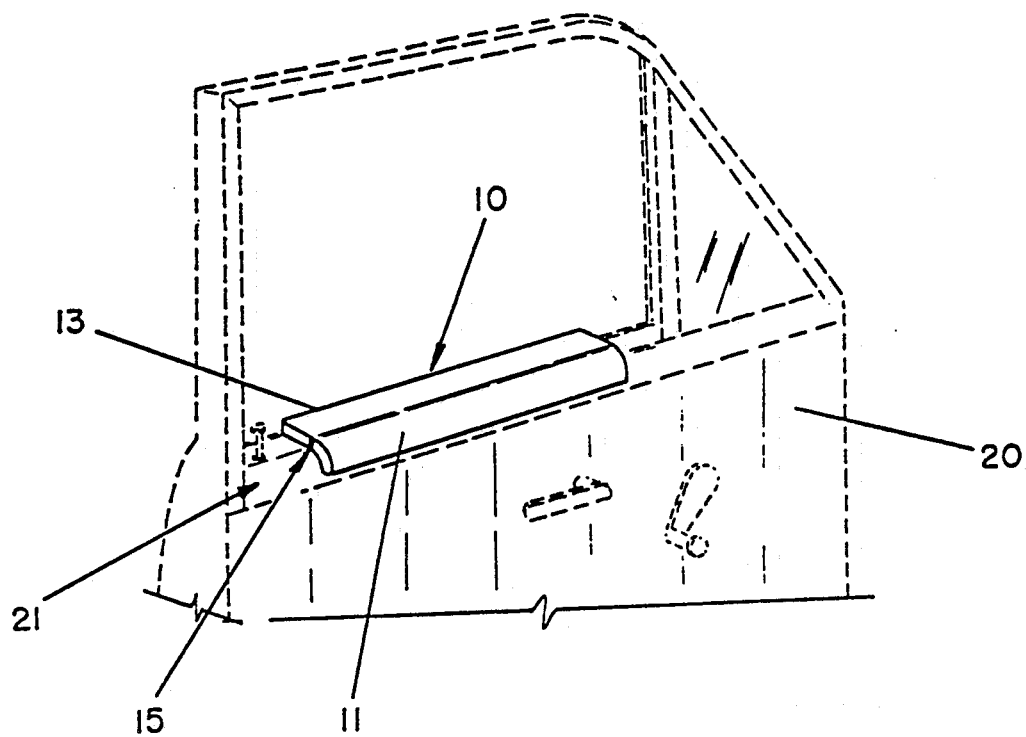
FIG. 3 is a plan view of the invention showing the armrest with the vehicle window fully retracted.

Reference is now made to FIG. 1 which illustrates the preferred embodiment of the invention. The armrest 10 comprises a longitudinal inner support segment 11 having adhering means 12 disposed on the underside thereof for securing the armrest to the vehicle window sill. A longitudinal outer support segment 13 is disposed proximate and outboard of inner segment 11. Both segments are preferably made of a resilient or flexible material disposed therein, such as foam rubber, and may be appropriately curved to conform to the configuration of the vehicle window sill, such as shown in FIG. 3. Many foam rubber materials available in the art have a curved shape which is readily adaptable to the armrest of the present invention and conformable to window sills.

Elongate weighting means, such as a rod 14, is provided along the outer edge of the outer longitudinal segment 13. This weighting means serves to return the outer segment 13 to a position flush with the vehicle window being fully retracted. Depicted as elongate in the drawings, the weighting means need not be as long as the segments, so long as it possesses sufficient stiffness to return the outer longitudinal segment to a flush position. Suitable materials for the weighting means include, but are not limited to, rods such as steel rods and welding rods, bars, tubes, magnets, and the like. The preferred material for use as weighting means is metal, although other materials, such as ceramics, woods, and plastics, are also useful in accordance with the invention. The material chosen should be sufficiently strong and heavy in order to insure proper positioning of the outer segment 13.

Figure 2:
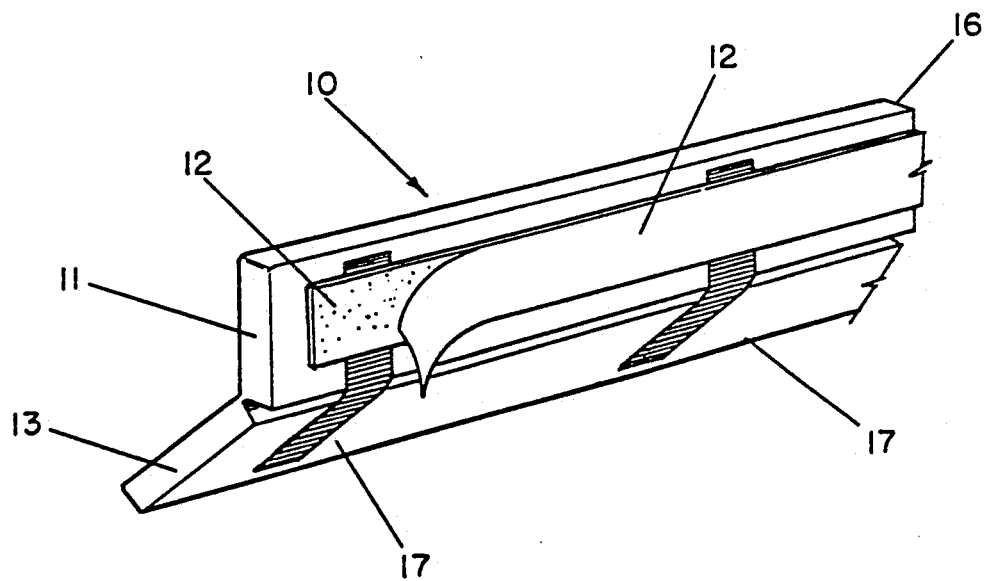
FIG. 2 is an underside view of an alternative embodiment of the invention.

A cover 16 encloses inner segment 11 and outer segment 13. In the preferred embodiment, such as shown in FIG. 1, the cover 16 only partially encloses the inner segment 11 so that adhering means, such as an adhesive strip 12 disposed on the inner flexible material such as a foam substrate 18, may be provided for affixing the inner segment 11 to the vehicle window sill. The cover may completely enclose the inner segment, such as shown in FIG. 2, with the adhering means, such as an adhesive strip 12, affixable to both the cover 16 and the window sill. The cover 16 should be selected with a view toward matching vehicle decor, as well as function. Suitable materials might include, but are not limited to, pile, mouton, leather, canvas, and other fabrics and combinations thereof. Color and material of cover 16 may be provided to blend with vehicle upholstery and color, as well as to provide a sufficient hinging function, as discussed below.

A slot 15 is integrally formed between inner segment 11 and outer segment 13, preferably as part of the cover material 16. As shown in the drawings, the slot 15 is thinner in cross section than the support segments 11 and 13. The function of such slot 15 is to serve as a hinge, and accommodate the molding preferably provided on the outer sill of a vehicle window. The slot 15 can also accommodate partially extended vehicle windows or vehicle windows which do not completely retract, in which case, excess cover material should be provided for the slot 15.

Disposed at the underside of inner longitudinal support segment 11 is adhering means 12. Adhering means 12 ensures adhesion between the inner support segment 11 and the vehicle window sill. Examples of such adhering means are "peel off" adhesives, hook and loop fasteners, adhesive cement, and other suitable adhesives.

Figure 4:
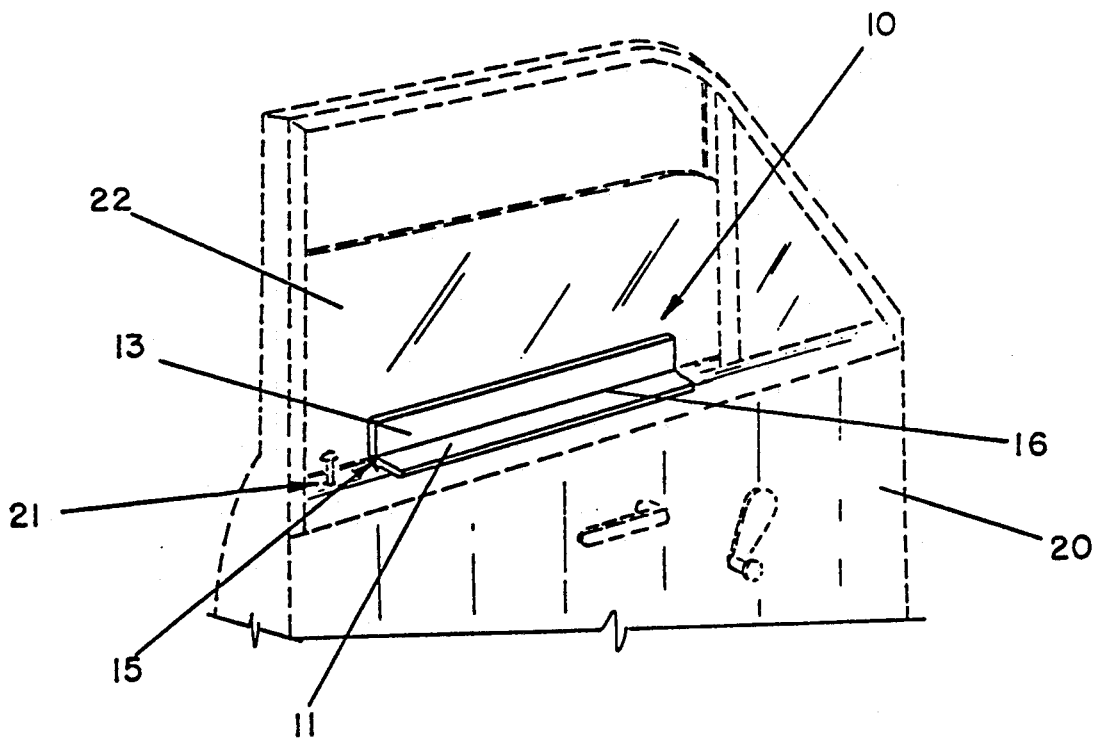
FIG. 4 is a plan view of the invention, showing the armrest with the vehicle window partially extended.

In the preferred embodiment of FIG. 1, the cover 16, in addition to its intrinsic covering function, also serves as hinging means for the inner and outer longitudinal segments. As the vehicle window is extended, the outer longitudinal support segment 13 pivots at slot 15, freely allowing upward passage of the vehicle window. FIG. 4 clearly depicts this hinging action of outer segment 13 provided by the cover 16. FIG. 3, on the other hand, illustrates the armrest 10 upon full retraction of the vehicle window. Weighting means 14 provides sufficient mass to ensure that outer longitudinal support segment 13 returns to a position fully flush with the vehicle window sill as the vehicle window is retracted.

FIG. 2 depicts an alternative embodiment of the invention. In this embodiment, hinging means for the inner segment 11 and outer segment 13 is provided by elastic means, such as elastic strips 17. Secured to the underside of the inner and outer segments, elastic strips 17 provide a hinging means complementary and additional to the hinging means provided by cover 16.

In use, such as shown in FIGS. 3 and 4, armrest 10, specifically inner segment 11, is affixed to window sill 21 of vehicle door 20. With window 22 fully retracted such as shown in FIG. 3, or partially extended into slot, outer movable segment 13 is flush with the vehicle sill 21. As vehicle window 22 is extended, outer longitudinal segment 13 pivots about the hinge means (provided by cover 16 or by cover 16 and elastic means 17). allowing free passage of window 22 thereby. In turn, retraction of window 22, allows outer longitudinal segment 13 to again position itself flush with the vehicle window will, effectively aided, of course, by weighting means 14.

The invention further comprises a method of making a window sill armrest for motor vehicles comprising the steps of:

(a) providing a longitudinal inner affixable resilient segment having an inner flexible support material and an adhering material disposed on one side thereof;

(b) providing a longitudinal outer resilient segment having an inner flexible support material and a weight member;

(c) positioning the longitudinal outer resilient segment proximate and outboard to the longitudinal inner resilient segment and forming a hinge between the outer segment and the inner segment; and (d) at least partially enclosing the weight member and the resilient segments, except for the adhering material, within a cover.

The hinge may be provided by the cover material, such as a thin fold between the segments, or adhesive elastic strips may be secured to the inner and outer resilient segments to provide the hinge to the armrest. The weight member is provided to the outer edge of the outer resilient segment. In the preferred embodiment, the inner resilient member is only partially enclosed by the cover so that the adhering material is disposed on the inner flexible material.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. An armrest adapted to be attached to the window sill of a motor vehicle comprising:
   a longitudinal inner support segment affixable to the window sill by adhering means disposed on an underside thereof;
   a longitudinal outer resilient support segment proximate and outboard of said inner support segment, said outer support segment comprising weighting means;
   means for longitudinally hinging said outer segment to said inner affixable segment, said hinging means comprising a slot, said slot being sufficiently deep to accommodate vehicle windows which only partially retract; and
   cover means for at least partially enclosing said segments.

2. The armrest of claim 1 wherein at least one of said support segments is curved to conform approximately to the curvature of the window sill.

3. The armrest of claim 1 wherein said hinging means is integral with said cover means.

4. The armrest of claim 3 wherein said hinging means is thinner in cross section than said support segments.

5. The armrest of claim 1 wherein said cover means comprises at least one material selected from the group consisting of pile, mouton, leather, canvas, fabrics, and combinations thereof.

6. The armrest of claim 1 wherein said weighting means comprises at least one material selected from the group consisting of metal, ceramic, wood and plastic.

7. The armrest of claim 1 wherein said adhering means on said inner segment comprises a member selected from the group consisting of "peel off" adhesive strips, hook and pile fasteners, and adhesive cement.

8. The armrest of claim 1 wherein said cover means completely encloses said outer support segment and only partially encloses said inner support segment.

9. An armrest adapted to be attached to the window sill of a motor vehicle comprising:
   a longitudinal inner support segment affixable to the window sill by adhering means disposed on an underside thereof;
   a longitudinal outer resilient support segment proximate and outboard of said inner support segment, said outer support segment comprising weighting means;
   means for longitudinally hinging said outer segment to said inner affixable segment, said hinging means comprising elastic folding means secured to said inner and outer resilient segments; and
   cover means for at least partially enclosing said segments.

10. The armrest of claim 9 wherein at least one of said support segments is curved to conform approximately to the curvature of the window sill.

11. The armrest of claim 9 wherein said hinging means is integral with said cover means.

12. The armrest of claim 11 wherein said hinging means is thinner in cross section than said support segments.

13. The armrest of claim 9 wherein said hinging means comprises a slot.

14. The armrest of claim 9 wherein said cover means comprises at least one material selected from the group consisting of pile, mouton, leather, canvas, fabrics, and combinations thereof.

15. The armrest of claim 9 wherein said weighting means comprises at least one material selected from the group consisting of metal, ceramic, wood and plastic.

16. The armrest of claim 9 wherein said adhering means on said inner segment comprises a member selected from the group consisting of "peel off" adhesive strips, hook and pile fasteners, and adhesive cement.

17. The armrest of claim 9 wherein said cover means completely encloses said outer support segment and only partially encloses said inner support segment.

18. The armrest of claim 9 wherein said elastic folding means comprises elastic strips.

19. An armrest adapted to be attached to the window sill of a motor vehicle comprising:
   a longitudinal inner support segment affixable to the window sill by adhering means disposed on an underside thereof;
   a longitudinal outer resilient support segment proximate and outboard of said inner support segment, said outer support segment comprising weighting means, said weighting means comprising an elongate member selected from the group consisting of rods, bars, tubes, and magnets;
   means for longitudinally hinging said outer segment to dinner affixable segment; and
   cover means for at least partially enclosing said segments.

20. The armrest of claim 19 wherein at least one of said support segments is curved to conform approximately to the curvature of the window sill.

21. The armrest of claim 19 wherein said hinging means is integral with said cover means.

22. The armrest of claim 21 wherein said hinging means is thinner in cross section than said support segments.

23. The armrest of claim 19 wherein said hinging means comprises a slot.

24. The armrest of claim 19 wherein said cover means comprises at least one material selected from the group consisting of pile, mouton, leather, canvas, fabrics, and combinations thereof.

25. The armrest of claim 19 wherein said weighting means comprises at least one material selected from the group consisting of metal, ceramic, wood and plastic.

26. The armrest of claim 19 wherein said adhering means on said inner segment comprises a member selected from the group consisting of "peel off" adhesive strips, hook and pile fasteners, and adhesive cement.

27. The armrest of claim 19 wherein said cover means completely encloses said outer support segment and only partially encloses said inner support segment.

28. An armrest adapted to be attached to the window sill of a motor vehicle comprising:

a longitudinal inner support segment affixable to the window sill by adhering means disposed on an underside thereof;

a longitudinal outer resilient support segment proximate and outboard of said inner support segment, said outer support segment comprising weighting means, said weighting means being disposed on the outer edge of said outer longitudinal support segment;

means for longitudinally hinging said outer segment to said inner affixable segment; and cover means for at least partially enclosing said segments.

29. The armrest of claim 28 wherein at least one of said support segments is curved to conform approximately to the curvature of the window sill.

30. The armrest of claim 28 wherein said hinging means is integral with said cover means.

31. The armrest of claim 30 wherein said hinging means is thinner in cross section than said support segments.

32. The armrest of claim 28 wherein said hinging means comprises a slot.

33. The armrest of claim 28 wherein said cover means comprises at least one material selected from the group consisting of pile, mouton, leather, canvas, fabrics, and combinations thereof.

34. The armrest of claim 28 wherein said weighting means comprises at least one material selected from the group consisting of metal, ceramic, wood and plastic.

35. The armrest of claim 28 wherein said adhering means on said inner segment comprises a member selected from the group consisting of "peel off" adhesive strips, hook and pile fasteners, and adhesive cement.

36. The armrest of claim 28 wherein said cover means completely encloses said outer support segment and only partially encloses said inner support segment.

37. An armrest adapted to be attached to the window sill of a motor vehicle comprising:

a longitudinal inner support segment affixable to the window sill by adhering means disposed on an underside thereof, said inner support segment comprising flexible material disposed therein and said adhering mean being affixable to said flexible material;

a longitudinal outer resilient support segment proximate and outboard of said inner support segment, said outer support segment comprising weighting means;

means for longitudinally hinging said outer segment to said inner affixable segment; and cover means for at least partially enclosing said segments, said cover means completely enclosing said outer support segment and only partially enclosing said inner support segment.

38. The armrest of claim 37 wherein at least one of said support segments is curved to conform approximately to the curvature of the window sill.

39. The armrest of claim 37 wherein said hinging means is integral with said cover means.

40. The armrest of claim 39 wherein said hinging means is thinner in cross section than said support segments.

41. The armrest of claim 39 wherein said hinging means comprises a slot.

42. The armrest of claim 37 wherein said cover means comprises at least one material selected from the group consisting of pile, mouton, leather, canvas, fabrics, and combinations thereof.

43. The armest of claim 37 wherein said weighting means comprises at least one material selected from the group consisting of metal, ceramic, wood and plastic.

44. The armrest of claim 37 wherein said adhering means on said inner segment comprises a member selected from the group consisting of "peel off" adhesive strips, hook and pile fasteners, and adhesive cement.

45. A method of making a window sill armrest for motor vehicles comprising the steps of:

(a) providing a longitudinal inner affixable resilient segment having an inner flexible support material and an adhering material disposed on one side thereof;

(b) providing a longitudinal outer resilient segment having an inner flexible support material and a weight member;

(c) positioning the longitudinal outer resilient segment proximate and outboard to the longitudinal inner resilient segment and forming a hinge between the outer segment and the inner segment by securing adhesive elastic strips to the inner and outer resilient segments to provide the hinge to the armrest; and (d) at least partially enclosing the weight member and the resilient segments, except for the adhering material, within a cover.

46. The armest of claim 45 wherein the inner resilient member is only partially enclosed by the cover so that he adhering material is disposed on the inner flexible material.

47. A method of making a window sill armrest for motor vehicles comprising the steps of:

(a) providing a longitudinal inner affixable resilient segment having an inner flexible support material and an adhering material disposed on one side thereof;

(b) providing a longitudinal outer resilient segment having an inner flexible support material and a weight member at the outer edge of the outer resilient segment;

(c) positioning the longitudinal outer resilient segment proximate and outboard to the longitudinal inner resilient segment and forming a hinge between the outer segment and the inner segment; and (d) at least partially enclosing the weight member and the resilient segments, except for the adhering material, within a cover.

48. The armrest of claim 47 wherein the inner resilient member is only partially enclosed by the cover so that the adhering material is disposed on the inner flexible material.

* * * * *